Patented Jan. 30, 1923.

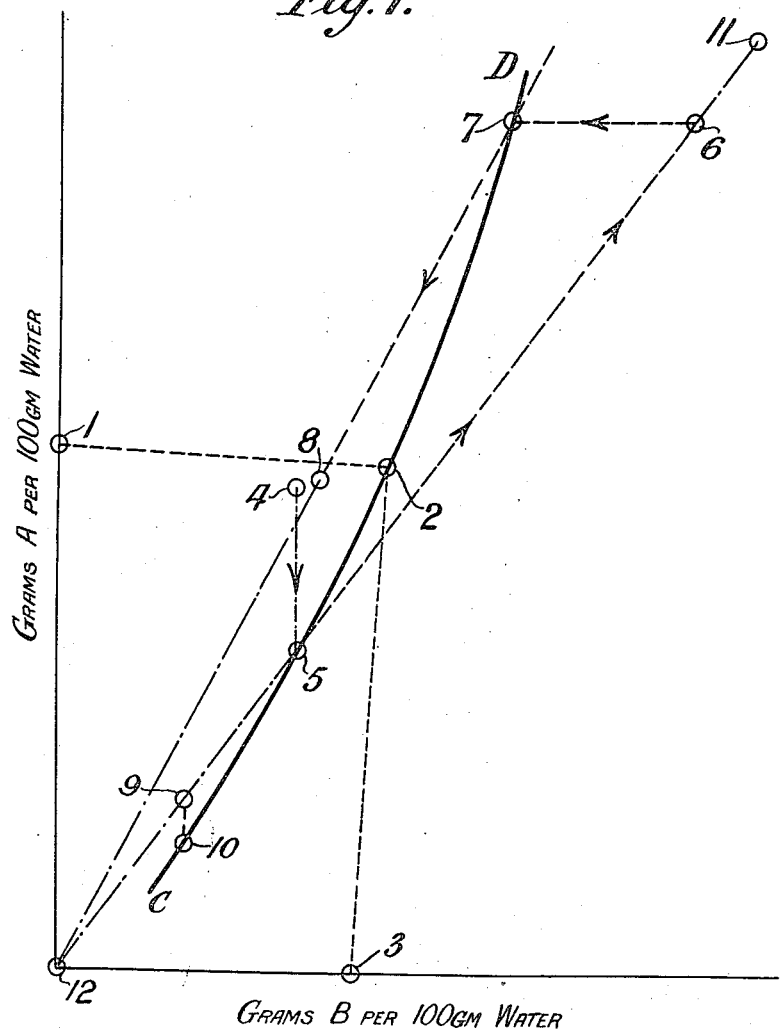

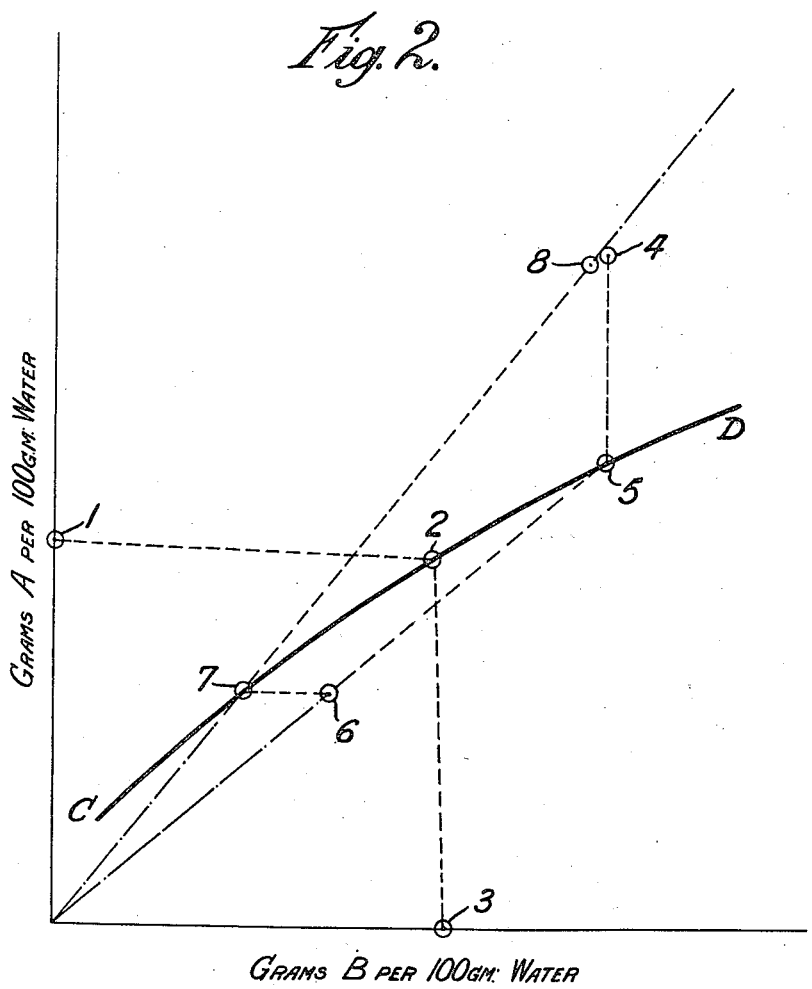

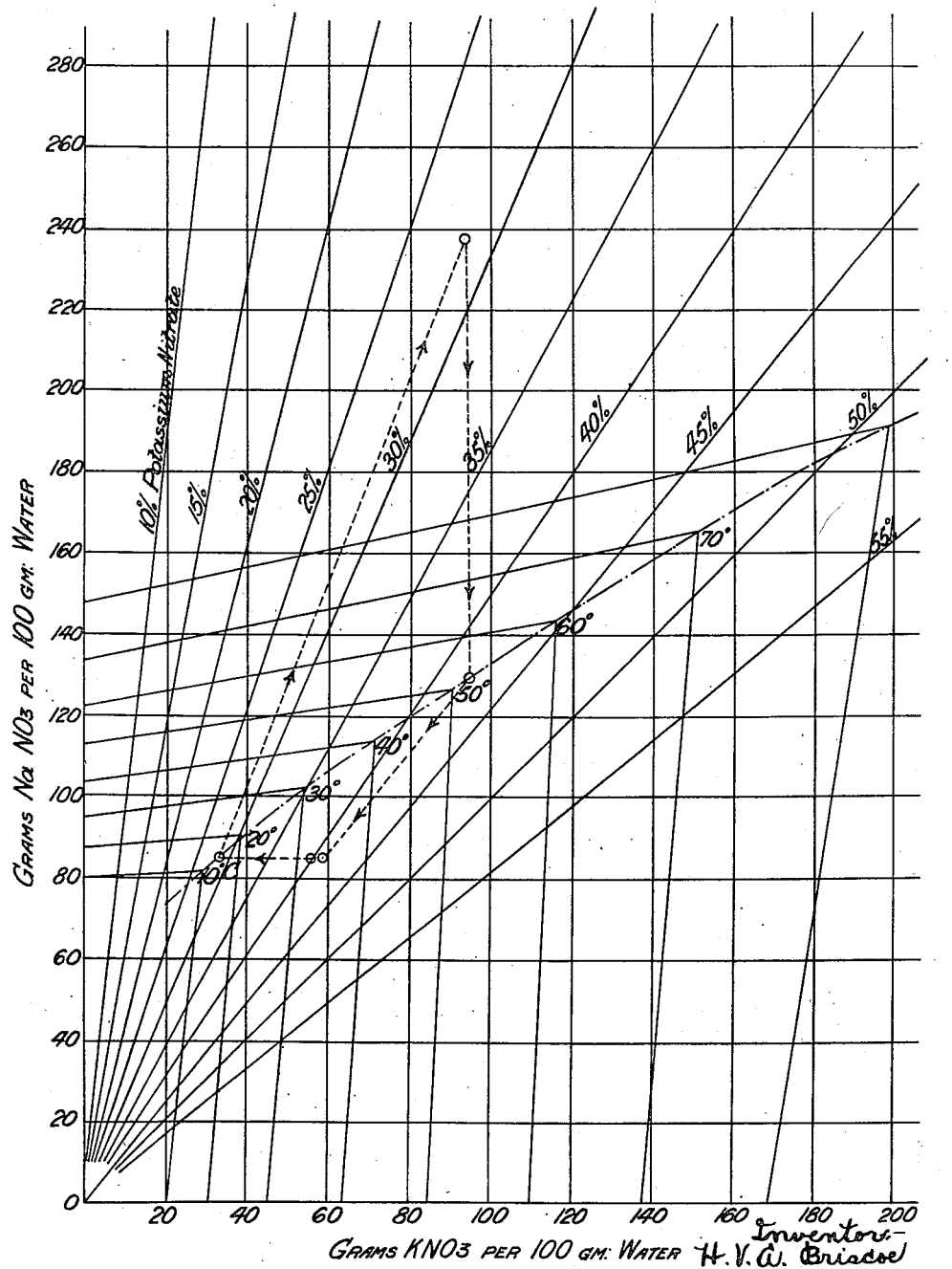

1,443,616

UNITED STATES PATENT OFFICE.

HENRY VINCENT AIRD BRISCOE, OF LONDON, ENGLAND, ASSIGNOR TO HIMSELF AND F. W. BERK AND COMPANY, LIMITED, OF LONDON, ENGLAND.

PROCESS FOR SEPARATING SOLIDS BY CRYSTALLIZATION FROM SOLVENTS.

Application filed March 22, 1921. Serial No. 454,515.

*To all whom it may concern:*

Be it known that I, HENRY VINCENT AIRD BRISCOE, a subject of the King of Great Britain, residing at 32 Blenheim Gardens, Cricklewood, London, England, have invented new and useful Improved Processes for Separating Solids by Crystallization from Solvents, of which the following is a specification.

The present invention relates to processes in which the separation of solids is accomplished by dissolving them in suitable solvents and crystallizing out the solids from the solution so obtained. It is specially applicable to cases where it is desired to separate two solids which upon crystallization tend to form mixed crystals.

According to the known methods hitherto employed such separations are accomplished by one of the following methods of crystallization which can be most intelligibly explained by considering a hypothetical mixture of two solids A and B. The mixture is dissolved to a relatively high concentration in a suitable solvent and the solution is allowed to cool and crystallize in one of two ways, viz. either (*a*) by cooling as far as possible, whereby a crystalline product is obtained in which the constituent A is present in a higher proportion than in the original mixture, but is still far from pure, or (*b*) by cooling only so long as constituent A is deposited in a state of practical purity and stopping crystallization and separating the crystals from the mother liquor, as soon as constituent B begins to be deposited and contaminate A.

In the first case (*a*), a considerable yield is obtained but is only to a small extent richer in A than was the original mixture. By several successive crystallizations in the same manner products successively richer in A are obtained, and finally practically pure A may be crystallized out, but in each crystallization a considerable proportion of material is left in the mother liquors and the final yield of A is necessarily quite small. By reworking the mother liquors a fair proportion of the total amounts of A and B may be obtained in a state of practical purity, but the process is extremely tedious and costly.

In the second case (*b*) the yield of pure A obtained is small. By concentrating the mother liquor and repeating the process of crystallization, further yields of pure A may be obtained, the quantity obtained decreasing at each repetition until the solution becomes relatively so rich in B that at last upon repeating the process of concentration pure B is first deposited. This separation of B may be repeated up to a certain point when again A will be deposited. Evidently this procedure is more complex and difficult to control than that denoted (*a*) and is also very tedious and costly.

Some special processes have been described for the separation of certain salt mixtures in which these mixtures are leached with water or with a solution of special composition in such a way that one of the constituents A is more or less completely dissolved and B is left in a state of enhanced purity. A repetition of the process, using pure water, is said in certain cases to leave a residue of B in a state of practical purity. Such processes are, however, fundamentally different from those in which the solids are dissolved completely to a clear solution in the solvent, as is the case in those described above and in the present invention.

The essential feature of this invention is that the conditions of concentration and temperature are altered when during crystallizing out such conditions of concentration and temperature approach a point at which both A and B are deposited together, whereupon crystallizing out the solution is continued whereby the simultaneous crystallization of A and B together is prevented.

The manner in which this is accomplished can most readily be described by reference to Figures 1 and 2 which represent typical solubility diagrams for any two compounds A and B which do not form double salts when crystallized together from the solvent.

In these figures the concentrations of the solution are expressed by plotting along the vertical and horizontal axes respectively, the weights of A and B dissolved in unit weight of solvent. For any given temperature the solubility relations of A and B are expressed by the lines 1.2: 2.3. The points 1 and 3 represent the solubilities of pure A and pure B respectively, and 2 represents that one particular concentration at which A and B can exist together in equilibrium with their saturated solution at the chosen temperature. There evidently is a single such concentration corresponding to each temperature and the curve C D is the locus of all such points. This curve therefore can evidently be sub-divided in equal increments of temperature and the points so determined connected by lines, which are shown as straight but are in some cases curved, with the solubilities of the pure salts at corresponding temperatures. Thus a series of temperature lines may be added to the diagram whereby it may be made to apply to any desired temperature range, becoming in effect a projection of a three dimensional solubility diagram in which the axis of temperature is perpendicular to the plane of the paper.

Considering now any solution of the concentration represented by the point marked 4, Figure 1, it is evident that as this cools it will begin to crystallize at the temperature corresponding to that point and deposit pure A. Thus the composition of the solution will change in a manner represented by movement downward along a vertical line drawn from 4.

It is evident from the diagram that when the point 5 is reached, a mixture of B with A will begin to crystallize out and as I have said above it is an essential feature of my invention to avoid this. Therefore, when the solution has cooled to a temperature equal or approximating closely to that represented by the point 5, I add to or remove from the solution solvent (which may of course if convenient be a dilute solution of one or both of the constituents) so as to prevent deposition of the mixture. Evidently the ratio of A to B in the solution is unaltered by the treatment which will therefore cause a change in the composition of the solution represented by movement along a straight line 11.12 passing through the point 5 and the origin, in the case of addition of water toward the origin and in the case of removal of water away from the origin.

Assuming addition of solvent to be made sufficient to change the composition of the solution to that represented by the point 9, it is evident that further cooling would then cause the deposition of a further quantity of A along the line 9.10 before admixture with B occurs, but by this means the composition of the final liquor would be still further removed from the point 4, to the neighbourhood of which it is desirable to return, if, as is best, a cyclic process is to be adopted. I prefer, therefore, in this case to remove solvent from the solution (e. g.; by evaporation or freezing) thereby changing the composition along the line 5.11 to a point 6 which is chosen and determined beforehand in the following manner:—

It is evident that in cooling the solution from any point on the line 5.11 it will first deposit pure B and will change in composition leftwards along a horizontal line, the while still depositing pure B, until it reaches a point on the line C D when a mixture of A and B will again crystallize. As it is desired that the solution shall then be of such a composition that it can readily be brought back to the vicinity of 4, I choose the point 6 so that its horizontal projection on the curve C D is at or near to the point of intersection of that curve with a straight line passing through the origin and the point 4.

I therefore cool the solution from the point 6 until it reaches or nearly reaches the point 7, when again the crystals of practically pure B are separated in some convenient manner, and the mother liquor is then treated by an addition of solvent to such an extent as will bring it to the composition represented by the point 8. This point is close to 4, and evidently a second cycle of operations, closely similar to the first, may be started therefrom resulting in the separation of further quantities of A and B each in a state of practical purity.

In applying my invention to substances of the type represented by the solubility diagram shown in figure 2, the cycle of operations is as follows:—

Starting with a solution of the concentration represented by the point 4, I cool and crystallize to a temperature represented by the point 5, the while depositing pure A. The crystals are then separated from the liquor and the latter is treated with further solvent sufficient to change its composition to that represented by the point 6, when further cooling will result in recrystallization of pure B until a temperature corresponding to the point 7 is reached. Then, after separation of the crystals from the liquor, this is heated and concentrated and/or treated with further quantities of the mixed salt to bring the composition to that represented by point 8 whence as the point approximates closely to the point 4, a second cycle similar to the first can be started. In this case also the point 4 being determined, point 6 is selected and determined beforehand in the manner described above.

In practice it is usually convenient, after the completion of each such cycle as above described, to add a quantity of the original crude mixture of A and B such as will in conjunction with the requisite increase or decrease of solvent, bring the total quantity of solution and its concentration to that employed at the commencement of the first cycle. The second cycle is thus made similar to the first, not only in mode of operation but also in the quantities of A and B separated.

The advantages of this procedure lie in simplication of control. The cycle which is most convenient practically for any particular case having been determined, I determine by trial some characteristic property, e. g., the density, of the solutions corresponding to points 4 and 8, Figure 1, or Figure 2. A relatively unskilled workman can then be instructed to bring the solutions to their densities at the proper stages of the treatment by concentration, addition of solvent, addition of solid or the like, to cool and crystallize the liquors to the proper temperatures, and to separate the crystals from the liquors at those temperatures.

By adhering to a set of conditions properly chosen in the manner described above, the same cycle can be followed for a large number of times, in fact, until the accumulation of impurities originally present in small quantities reaches the point at which those impurities begin to crystallize with A and B or both, and thus alter the number of components from that originally present. At this point the solution must be abandoned or treated in some different way for the renewal of the impurities, as e. g., by concentrating to a point at which they will "salt out".

As an example of my process, I may cite the treatment of the crude mixture of potassium and sodium nitrates produced in Chile by separate crystallization of the mother liquors separated from the sodium nitrate crystallization and containing from 30%–40% potassium nitrate.

The mixture is dissolved in water to a relatively low concentration such that when it crystallizes only potassium nitrate is deposited and pure potassium nitrate will continue to be deposited until it reaches a temperature of say 14° C. it being assumed that 15° C. is the lowest temperature to which it is proposed in the practice to cool the solution. From the solubility diagram for the system, sodium nitrate—potassium nitrate—water—given in Figure 3 (in which the course of operations hereinafter described is indicated by dotted lines) it is found that for a mixture containing 40% potassium nitrate this concentration is 56.5 grams $KNO_5$ and 85 grams $NaNO_3$ or 141.5 grams of a 36% mixture per 100 grams water. A simple trial having established that such a solution has a density of 97° Tw. at 39° C., a 40% $KNO_3$ mixture is dissolved in water to a solution of that density heat being applied as required. Preferably the solution is heated to about 39° C. The solution is then considerably removed from the point of saturation and may readily be filtered without risk of crystallization. Such filtration is usually necessary and the cycle is in this case commenced at the stage indicated in order to permit such filtration to be made.

The clear solution is then allowed to cool and crystallize until it has attained a temperature of 15° C. when the crystals are separated from the liquor. This is most conveniently effected by running off the bulk of the liquor and draining the crystals in a hydro-separator, the liquor from which is added to the main bulk of the mother liquor.

In order to complete the separation of the mother liquor from the crystals as far as is practically possible, I prefer to wash the crystals on the centrifugal with a small quantity of water, these drainings also being added to the main bulk of mother liquor. The crystals discharged from the centrifugal will then be found to contain about 3% of water, 95% of potassium nitrate, the remaining 2% being sodium nitrate and other impurities.

The mother liquors are then transferred to an evaporator which may be of any convenient type, e. g., an open tank containing steam coils, or a multiple effect evaporator capable of dealing with highly concentrated solutions, or an open pan heated by direct fire, and the liquors are concentrated at the boiling point until they have a density of 120° Tw. at a temperature of 120° C. In certain cases the density of the solution may be judged by its having attained a certain boiling point. For example, in this case the point at which the evaporation should cease may be determined by the boiling point of the solution having reached the temperature of 120° C.

This solution is then run to a crystallizer which is provided with a large run-off pipe or opening at its lowest point, this opening being provided with suitable means such as a plug, cock or the like device, for controlling the flow of the liquor.

In this crystallizer the solution is allowed to cool until it reaches a temperature of 52° C.

The foregoing conditions are given simply as instances of conditions which have been found convenient in practice. It is evident that the concentration may be carried to a higher degree, in which case the cooling would be stopped at a higher temperature. The actual degree of concentration of the solution worked to is a matter of choice, but having determined that point, the lowest temperature to which it may be cooled without deposition of potassium nitrate crystals, is automatically fixed, and can be read off from the solubility diagram, by ascertaining, e. g., by analysis, the actual composition of the liquor.

During this crystallization process, pure sodium nitrate uncontaminated with potassium nitrate is deposited. When the cooling has proceeded so far that the predetermined temperature is reached, the whole contents of the crystallizer are rapidly transferred to the centrifugal separator, which has preferably been previously heated by means of steam to the same temperature as the solution. With care it is possible to transfer the whole of the solution and crystals to the centrifugal without any serious drop of temperature.

In this way the mother liquor is rapidly and almost completely separated from the crystals at the actual temperature desired, and by washing the crystals on the centrifugal with a small quantity of warm water, also at that temperature, the separation of the mother liquor can be still further increased.

After the liquor has run from the centrifugal machine, it is preferably treated by a small addition of water in order to render it unsaturated and thus avoid practical difficulty in pumping and handling it. It is then transferred to a vessel in which, by the addition of more sodium potassium nitrate mixture and more water, it is brought to the original condition of concentration, i. e., 97° Tw. at 39° C.

The sodium nitrate removed from the centrifugal is also of a relatively high degree of purity. Under the circumstances outlined above it will be found that the sodium nitrate contains about 3% of water, about 94½ to 95% of sodium nitrate, and the remainder approximately 2½%, consists of potassium nitrate and other impurities.

At the completion of this series of operations, the liquor is evidently in a condition very closely similar to that with which the first cycle was commenced, and a second cycle can therefore be made on exactly the same lines and resulting in a similar production of practically pure potassium nitrate and sodium nitrate.

What I claim is:—

1. A process for separating two bodies from a mixture thereof, which consists in bringing a solution of the mixture to conditions of concentration and temperature at which one body only tends to crystallize out on cooling, cooling the solution, separating the crystals of the first body from the solution before the other body begins to crystallize out, bringing the solution to conditions of concentration and temperature at which the second body only tends to crystallize out on cooling, cooling the solution, separating the crystals of the second body from the solution before the other body begins to crystallize out, and then bringing the solution of the mixture to conditions of concentration and temperature at which either body only tends to crystallize out on cooling.

2. A process for separating two bodies from a mixture thereof, which consists in bringing a solution of the mixture to conditions of concentration and temperature at which one body only tends to crystallize out on cooling, cooling the solution, separating the crystals of the first body from the solution before the other body begins to crystallize out, bringing the solution to conditions of concentration and temperature at which the second body only tends to crystallize out on cooling, cooling the solution, separating the crystals of the second body from the solution before the other body begins to crystallize out, and then bringing the solution of the mixture to conditions of concentration and temperature at which the first body only tends to crystallize out on cooling.

3. A process for separating two bodies from a mixture thereof, which consists in bringing a solution of the mixture to conditions of concentration and temperature at which one body only tends to crystallize out on cooling, cooling the solution, separating the crystals of the first body from the solution before the other body begins to crystallize out, bringing the solution to conditions of concentration and temperature at which the second body only tends to crystallize out on cooling, cooling the solution, arresting the cooling at a point before the first body begins to crystallize out, separating the crystals of the second body from the solution, and then restoring the solution to conditions of concentration and temperature at which the first body tends to crystallize out on cooling.

4. A process for separating two bodies from a mixture thereof, which consists in bringing a solution of the mixture to conditions of concentration and temperature at which one body only tends to crystallize out on cooling, cooling the solution, separating the crystals of the first body from the solution before the other body begins to crystallize out, removing the solvent from the solution and so bringing the solution to conditions of concentration and temperature at which the second body only begins to crystallize out on cooling, cooling the solution, separating the crystals of the second body from the solution before the other body begins to crystallize out, and then adding solvent to the solution and so restoring the solution to conditions of concentration and temperature at which the first body only tends to crystallize out on cooling.

5. The production of purified potassium nitrate and purified sodium nitrate from a mixture of the two salts by making a solution of the mixture of such a degree of concentration and of such a temperature that potassium nitrate only will tend to crystallize out on cooling, cooling the solution, separating the potassium nitrate crystals from the liquor before sodium nitrate begins to crystallize out, strengthening the liquor to a point at which sodium nitrate only tends to crystallize out on cooling, cooling the liquor, separating the sodium nitrate crystals before the potassium nitrate begins to crystallize out, and restoring the liquor to such a degree of concentration and to such a temperature that potassium nitrate only tends to crystallize out.

In testimony that I claim the foregoing as my invention I have signed my name this 24th day of February 1921.

HENRY VINCENT AIRD BRISCOE.